(12) United States Patent
Cho et al.

(10) Patent No.: US 9,663,654 B2
(45) Date of Patent: May 30, 2017

(54) RESIN COMPOSITION COMPRISING POLYALKYLENE CARBONATE

(71) Applicant: LG CHEM, LTD., Seoul (KR)

(72) Inventors: Hyun Ju Cho, Daejeon (KR); Jin Hwa Seo, Daejeon (KR); Seung Young Park, Daejeon (KR); Jung Min Sohn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/392,314

(22) PCT Filed: Jun. 30, 2014

(86) PCT No.: PCT/KR2014/005812
§ 371 (c)(1),
(2) Date: Dec. 24, 2015

(87) PCT Pub. No.: WO2014/209086
PCT Pub. Date: Dec. 31, 2014

(65) Prior Publication Data
US 2016/0177088 A1   Jun. 23, 2016

(30) Foreign Application Priority Data

Jun. 28, 2013 (KR) .................. 10-2013-0075862
Jun. 27, 2014 (KR) .................. 10-2014-0080038

(51) Int. Cl.
C08L 69/00 (2006.01)
C08L 1/00 (2006.01)
C08J 5/18 (2006.01)
C08L 1/02 (2006.01)
C08L 33/06 (2006.01)

(52) U.S. Cl.
CPC ............. *C08L 69/00* (2013.01); *C08J 5/18* (2013.01); *C08L 1/02* (2013.01); C08L 33/06 (2013.01)

(58) Field of Classification Search
CPC ............. C08L 69/00; C08L 1/02; C08L 33/06
See application file for complete search history.

(56) References Cited

U.S. PATENT DOCUMENTS

| | | | |
|---|---|---|---|
| 5,378,786 A | 1/1995 | Uku et al. | |
| 2009/0234042 A1 | 9/2009 | Luinstra | |
| 2012/0196958 A1 | 8/2012 | Park et al. | |
| 2012/0208928 A1* | 8/2012 | Chen | C08J 3/005 523/447 |
| 2013/0102715 A1* | 4/2013 | Kim | C08L 69/00 524/267 |

FOREIGN PATENT DOCUMENTS

| | | |
|---|---|---|
| EP | 2426174 A1 | 3/2012 |
| JP | 7-109413 A | 4/1995 |
| JP | 3455964 B2 | 8/2003 |
| JP | 2005-179446 A | 7/2005 |
| JP | 2007-131756 A | 5/2007 |
| JP | 2009534509 A | 9/2009 |
| JP | 2012-504166 A | 2/2012 |
| JP | 2012-057158 A | 3/2012 |
| KR | 10-2009-0129548 A | 12/2009 |
| KR | 10-2012-0024477 A | 3/2012 |
| KR | 10-2012-0084891 A | 7/2012 |
| KR | 10-2012-0093843 A | 8/2012 |
| KR | 10-2013-0048154 A | 5/2013 |
| KR | 10-2014-0118881 A | 10/2014 |

OTHER PUBLICATIONS

Dexiu Wang et al., "Transparent bionanocomposites with improved properties from poly(propylene carbonate) (PPC) and cellulose nanowhiskers (CNWs)", Composites Science and Technology 85, 2013, pp. 83-89.
"Mechanical and thermal properties of PLA composites with cellulose nanofibers and standard size fibers"; M. Kowalczyk, et al.; Composites: Part A 42 (2011) 1509-1514.
"Structure and properties of composites of highly crystalline cellulose with polypropylene: Effects of polypropylene molecular weight" Qiu, et al.; European Polymer Journal 42 (2006) 1059-1068.
"Examination of Biodegradability of Poly(ethylene carbonate) and Poly (propylene carbonate) in the Peritoneal Cavity in Rats"; Kawaguchi, et al. Chem. Phar. Bull 31(4) 1400-1403 (1983), Aug. 6, 2016.
"Poly(ethylene carbonate)s, part I: Syntheses and structural effects on biodegradation"; Acemoglu, et al.; Journal of Controlled Release 49 (1997) 263-276.
"Copolymerization of Carbon Dioxide and Epoxide"; Polymer Letters vol. 7, pp. 287-292 (1969).
"Synthesis and Reactions of Polycarbonate with Pendant Vinyl Groups"; Yoshida, et al.; Polymer Journal, vol. 14, No. 4, pp. 327-330 (1982).
"Composites reinforced with cellulose based fibres" Bledzki, et al.; Prog. Polym. Sci. 24 (1999) 221-274.
"Enzymatic degradation of poly(propylene carbonate) and poly-(propylene carbonate-co-e-caprolactone) synthesized via CO2 fixation"; Hwang, et al.; Catalysis Today 115 (2006) 288-294.
Hu, Xin, et al., "Toward environment-friendly composites of poly-(propylene carbonate) reinforced with cellulose nanocrystals," Composites Science and Technology, 2013, vol. 78, Elsevier, Amsterdam, NL, pp. 63-68.

* cited by examiner

*Primary Examiner* — Robert Harlan
(74) *Attorney, Agent, or Firm* — Dentons US LLP

(57) ABSTRACT

This disclosure relates to a resin composition that comprises polyalkylene carbonate, polylactide, polyalkyl(meth)acrylate, and cellulose, and has excellent biodegradability and mechanical properties, and yet, exhibits excellent thermal stability. Thus, the resin composition according to the present invention may be used in various application fields such as various films, sheets, disposable products, electronic goods, and interior material for automobiles.

9 Claims, 1 Drawing Sheet

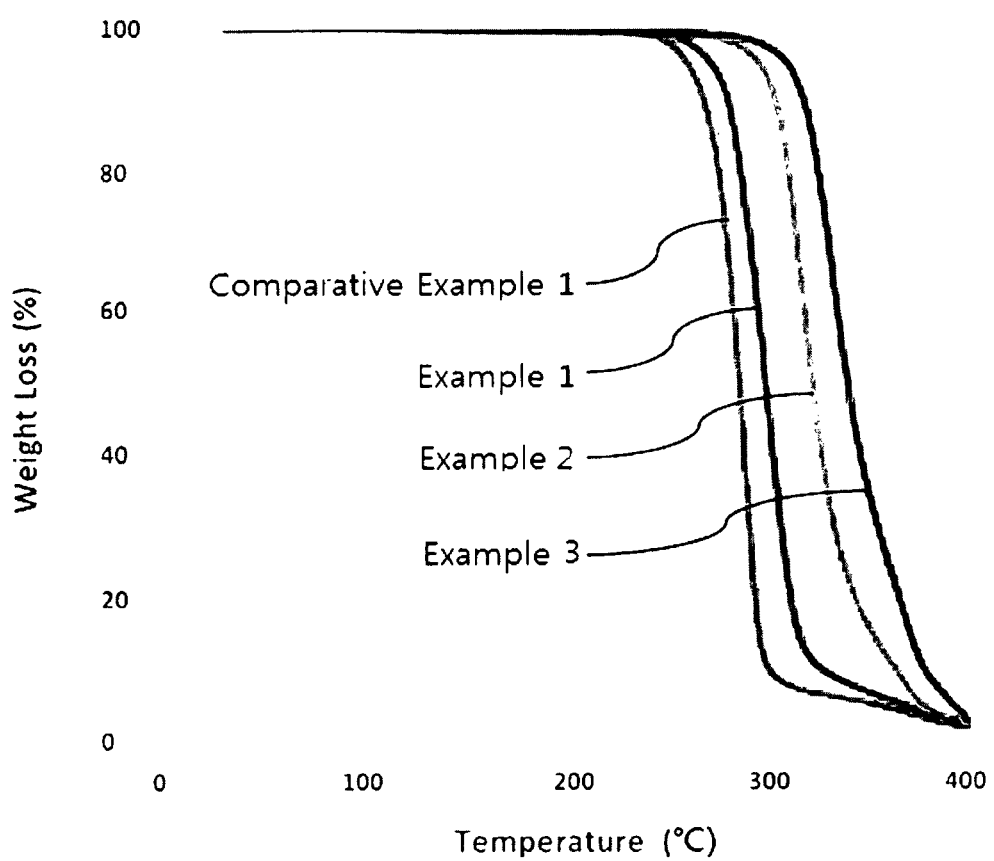

RESIN COMPOSITION COMPRISING POLYALKYLENE CARBONATE

FIELD OF THE INVENTION

The present invention relates to a resin composition comprising polyalkylene carbonate, and more specifically, a resin composition that comprises polyalkylene carbonate, polylactide, polyalkyl(meth)acrylate, and cellulose, and thus, has excellent biodegradability and mechanical properties, and yet, has improved thermal stability compared to the existing composition.

This application is a National Stage Entry of International Application No. PCT/KR2014/005812, filed Jun. 30, 2014, and claims the benefit of Korean Application No. 10-2013-0075862, filed on Jun. 28, 2013, and Korean Application No. 10-2014-0080038, filed on Jun. 27, 2014, all of which are hereby incorporated by reference in their entirety for all purposes as if fully set forth herein.

BACKGROUND OF THE INVENTION

Polyalkylene carbonate is noncrystalline transparent resin, and unlike aromatic polycarbonate that is engineering plastic of a similar type, it exhibits biodegradability and can be thermally decomposed at low temperature, and is completely decomposed into water and carbon dioxide without carbon residue.

However, although polyalkylene carbonate has excellent transparency, tensile strength, elasticity, oxygen barrier property and the like, if processed in the form of a pellet or a film, it may not be easy to handle due to blocking, and dimension stability may be lowered.

Thus, there has been an attempt to use in combination with other kinds of resin that can improve the properties of polyalkylene carbonate, for example, biodegradable polylactide, and the like. Since polylactide (or polylactic acid) resin is based on biomass unlike the existing crude oil-based resin, it can be utilized as renewable resource, discharges less global warming gas $CO_2$ compared to the existing resin when produced, and is biodegraded by water and microorganism when landfilled, and thus, is environment-friendly, and has appropriate mechanical strength equivalent to the existing crude oil-based resin.

The polylactide has been mainly used for a disposable packaging/container, coating, foam, a film/sheet and fiber, and recently, there are active efforts to combine polylactide with the existing resin such as ABS, or polypropylene and the like to reinforce the physical properties, for semipermanent use such as exterior material for a mobile phone or interior material for an automobile and the like. However, the application range is limited as yet, due to the weak points of the properties of polylactide itself such as being self biodegradable by catalyst used for preparation, moisture in the air, and the like.

A resin composition comprising polyalkylene carbonate and polylactide has limitations in that as the content of polylactide increases, unique properties of polyalkylene carbonate is rapidly degraded, thus Significantly exhibiting property offsetting, and property improvement effect is not sufficient.

For example, JP-H07-109413A suggests a blend of polylactide and aromatic polycarbonate resin. However, there are problems in that simple melt-mixing of polylactide and aromatic polycarbonate cannot achieve uniform compatibilization because of large melt viscosity difference, and that it is difficult to achieve stable pelletization because, for example, molten resin is discharged with pulsation from the nozzle of kneading extruder. And, since it has non-pearly luster, if directly mixed with a coloring agent to color, haze may be marked, and coloring may be difficult, and thus, the use is limited.

In case a sheet is prepared only from polyethylene carbonate resin and processed into an inflatable product, fusion may seriously occur between sheets, thus significantly degrading workability and product storage. In case polylactide is added to polyethylene carbonate, although sheet fusion may be improved to some degree, transparency may be degraded. Therefore, there is a demand for a resin composition that does not have fusion problem and has excellent workability and product storage, which are required for inflatable products, and can prepare product with high transparency.

SUMMARY OF THE INVENTION

Technical Objectives

It is an object of the invention to provide a resin composition that maintains excellent biodegradability and mechanical properties of a resin composition comprising polyalkylene carbonate and polylactide as they are, and yet, exhibits high thermal stability.

Technical Solutions

The present invention provide a resin composition comprising polyalkylene carbonate comprising a repeat unit represented by the following Chemical Formula 1; polylactide comprising a repeat unit represented by the following Chemical Formula 2; polyalkyl(meth)acrylate; and cellulose:

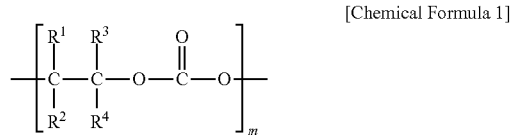

[Chemical Formula 1]

in the Chemical Formula 1, $R^1$ to $R^4$ are independently hydrogen, a C1-20 linear or branched alkyl group, a C6-20 aryl group, a C2-20 alkenyl group or a C3-20 cycloalkyl group, and at least two of $R^1$ to $R^4$ may be connected with each other to form a C3-10 cycloalkyl group, and m is an integer of 10 to 1.000:

[Chemical Formula 2]

in the Chemical Formula 2, n is an integer of 10 to 1000; and the alkyl group of the polyalkyl(meth)acrylate is a C1-20 linear or branched alkyl group, or a C3-10 cycloalkyl group.

Advantageous Effect of the Invention

The resin composition of the present invention maintains excellent biodegradability and mechanical properties of a resin composition comprising polyalkylene carbonate and polylactide as they are, and yet, exhibits high thermal stability, and thus, it may be used in various application fields such as various films, sheets, disposable products, electronic goods, and interior material for automobiles.

BRIEF DESCRIPTION OF THE DRAWINGS

FIG. 1 is a graph showing TGA analysis results of the resin compositions according to Examples 1 to 3 and Comparative Example 1.

DETAILED DESCRIPTION OF THE INVENTION

The resin composition of the present invention comprises polyalkylene carbonate comprising a repeat unit represented by the following Chemical Formula 1; polylactide comprising a repeat unit represented by the following Chemical Formula 2; polyalkyl(meth)acrylate; and cellulose.

[Chemical Formula 1]
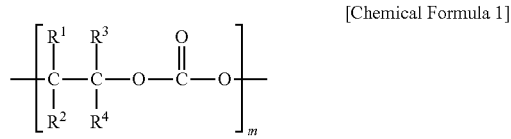

in the Chemical Formula 1, $R^1$ to $R^4$ are independently hydrogen, a C1-20 linear or branched alkyl group, a C6-20 aryl group, a C2-20 alkenyl group or a C3-20 cycloalkyl group, and at least two of $R^1$ to $R^4$ may be connected with each other to form a C3-10 cycloalkyl group, and m is an integer of 10 to 1,000;

[Chemical Formula 2]

in the Chemical Formula 2, n is an integer of 10 to 1000; and the alkyl group of the polyalkyl(meth)acrylate is a C1-20 linear or branched alkyl group, or a C3-10 cycloalkyl group.

The terms as used herein are used only to explain illustrative examples, and are not intended to limit the invention. Singular expressions include plural expressions, unless they have clearly different meanings in the context. It should be understood that as used herein, the terms "comprise" or "have" and the like designate the existence of practiced characteristics, numbers, steps, constitutional elements or combinations thereof, but do not preclude the existence or possibility of adding one or more other characteristics, numbers, steps, constitutional elements or combinations thereof.

Although various modifications can be made to the present invention and the present invention may have various forms, hereinafter, specific embodiments will be illustrated and explained in detail. However, it should be understood that it is not intended to limit the invention to specific disclosed forms, and all the modifications, equivalent or replacements within the scope of the idea and technology of the invention are included.

Hereinafter, the resin composition of the present invention will be explained in detail.

The resin composition according to one aspect of the invention comprises polyalkylene carbonate comprising a repeat unit represented by the following Chemical Formula 1; polylactide comprising a repeat unit represented by the following Chemical Formula 2; polyalkyl(meth)acrylate; and cellulose.

[Chemical Formula 1]
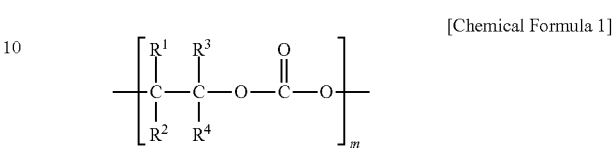

in the Chemical Formula 1, $R^1$ to $R^4$ are independently hydrogen, a C1-20 linear or branched alkyl group, a C6-20 aryl group, a C2-20 alkenyl group or a C3-20 cycloalkyl group, and at least two of $R^1$ to $R^4$ may be connected with each other to form a C3-10 cycloalkyl group, and m is an integer of 10 to 1,000;

[Chemical Formula 2]
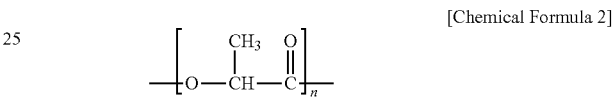

in the Chemical Formula 2, n is an integer of 10 to 1000; and the alkyl group of the polyalkyl(meth)acrylate is a C1-20 linear or branched alkyl group, or a C3-10 cycloalkyl group.

The polyalkylene carbonate is a noncrystalline polymer comprising a repeat unit represented by the Chemical Formula 1. Unlike aromatic polycarbonate which is synthetic resin of a similar type, it can be biodegraded and thermally decomposed at low temperature, and it has advantage in that it is completely decomposed into carbon dioxide and water without carbon residue. And, the polyalkylene carbonate has relatively low glass transition temperature (Tg) of about 40° C. or less, for example, about 10 to about 40° C., and it can be controlled within this range (Inoue et al. Polymer J., 1982, 14, 327-330).

Although a method for preparing the polyalkylene carbonate of the present invention is not specifically limited, for example, it may be obtained by copolymerization of an epoxide-based compound and carbon dioxide. Alternatively, it may be obtained by ring opening polymerization of cyclic carbonate. The copolymerization of alkylene oxide and carbon dioxide may be conducted in the presence of a metal complex compound such as zinc, aluminum, cobalt and the like.

In case polyalkylene carbonate is prepared by copolymerization of an epoxide-based compound and carbon dioxide in the presence of an organic metal catalyst, the epoxide-based compound may be ethylene oxide, propylene oxide, 1-butene oxide, 2-butene oxide, isobutyrene oxide, 1-pentene oxide, 2-pentent oxide, 1-hexene oxide, 1-octene oxide, cyclopentene oxide, cyclohexene oxide, styrene oxide or butadiene monoxide and the like, or various epoxide-based compounds of two or more kinds selected therefrom, but is not limited thereto.

The polyalkylene carbonate may be a homopolymer comprising a repeat unit represented by the Chemical Formula 1; or it may be a copolymer comprising at least two repeat units belonging to the category of the Chemical Formula 1, or a copolymer comprising an alkylene oxide-based repeat unit together with the repeat unit represented by the Chemical Formula 1.

However, the polyalkylene carbonate may be a copolymer comprising at least one kind of the repeat unit represented by the Chemical Formula 1 in the content of about 40 wt % or more, preferably about 60 wt % or more, more preferably about 80 wt % or more, so that unique properties resulting from the repeat unit represented by the Chemical Formula 1 (for example, biodegradability, elongation, flexibility or low glass transition temperature and the like) may be maintained.

According to one embodiment of the invention, the polyalkylene carbonate may be, for example, polyethylene carbonate, polypropylene carbonate, polypentene carbonate, polyhexene carbonate, polyoctene carbonate, polycyclohexene carbonate and copolymers thereof, but is not limited thereto, and $R^1$ to $R^4$ may be selected from appropriate functional groups considering the mechanical properties or biodegradability of resin to be finally obtained. For example, in case the functional group is hydrogen or a functional group having a relatively small carbon number, it may be more favorable in terms of biodegradability, and in case it is a functional group having a relatively large carbon number, it may be favorable in terms of mechanical properties such as strength of resin and the like. For specific example, it has been reported that polyethylene carbonate is biodegraded more rapidly compared to polypropylene carbonate (Inoue et al. Chem. Pharm. Bull, Jpn, 1983, 31, 1400; Ree et al. Catalysis Today, 2006, 115, 288-294).

And, in the polyalkylene carbonate, the polymerization degree m of the repeat unit represented by the Chemical Formula 1 may be about 1 to about 1,000, preferably about 50 to about 500. And, polyalkylene carbonate comprising the repeat unit may have weight average molecular weight of about 10,000 to about 1,000,000, preferably about 50,000 to about 500,000. As the polyalkylene carbonate has such polymerization degree and weight average molecular weight, a molded product prepared therefrom may exhibit biodegradability together with mechanical properties such as appropriate strength and the like.

And, although it has excellent transparency, tensile strength, elasticity, oxygen barrier property and the like, in case processed in the form of a pellet or a film, it may be difficult to handle due to blocking, and dimension stability may be degraded.

Particularly, in case a sheet is prepared only from polyethylene carbonate and processed into an inflatable product, blocking between sheets may seriously occur, and thus, workability and product storage may be significantly degraded.

Thus, there has been an attempt to use in combination with other kinds of resins that can improve the physical properties of polyalkylene carbonate (for example, biodegradable polylactide and the like). The previously known resin compositions comprising polyalkylene carbonate and polylactide have limitations in that property offsetting was significantly exhibited, for example, unique properties of polyalkylene carbonate were rapidly degraded, as the content of polylactide increases, and property improvement effect was not sufficient. However, since the resin composition of the present invention comprises polyalkylene carbonate, polylactide, polyalkyl(meth)acrylate and cellulose at the appropriate ratio, it has excellent biodegradability and mechanical properties, and yet, exhibits little blocking during processing and has excellent thermal stability, and thus, it may be preferably used for semipermanent use such as a sheet, a food packaging film, a flooring, packaging of electronic goods, or interior material for automobile and the like.

Commonly, lactide may be classified into L-lactide consisting of L-lactide. D-lactide consisting of D-lactide, and meso-lactide consisting of each one L-form and D-form. And, lactide comprising L-lactide and D-lactide at 50:50 is referred to as D,L-lactide or rac-lactide. It is known that if polymerization is progressed using only L-lactide or D-lactide with high optical purity, L- or D-polylactide (PLLA or PDLA) with very high stereoregularity is obtained, and it is also known that the polylactide has rapid crystallization speed and crystallization degree compared to polylactide with low optical purity. However, as used herein, the term "lactide monomer" is defined to include all forms of lactides regardless of property difference of lactide according to the form and property difference of polylactide prepared therefrom.

The polylactide may be polymerized from L-lactic acid, D-lactic acid or L,D-lactic acid. The polylactide may be prepared by a method comprising forming the following repeat unit by ring opening polymerization of lactide monomers, and after the ring opening polymerization and repeat unit forming process are completed, polymer may be referred to as polylactide. Wherein, all forms of lactides may be included in the category of the lactide monomer, as explained above.

According to one embodiment of the invention, the polymerization degree of the repeat unit of the Chemical Formula 2 may be about 10 to 1,000, preferably 50 to 500, and it may have weight average molecular weight of about 100,000 to about 1,000,000. As the polylactide has such polymerization degree and weight average molecular weight, a molded product obtained therefrom may exhibit biodegradability together with mechanical properties such as appropriate strength and the like.

In the category of the polymer that can be referred to as "polylactide", polymers of all the states after the ring opening polymerization and repeat unit forming process are completed, for example, unpurified or purified polymer after the ring opening polymerization is completed, polymer included in a liquid or solid resin composition before molded into a product, or polymer included in molded plastic or fabric and the like may be included.

According to one embodiment of the invention, the resin composition may comprise the polylactide in the content of about 0.5 to about 20 parts by weight, preferably about 0.5 to about 10 parts by weight, more preferably about 0.5 to about 6 parts by weight, based on 100 parts by weight of the polyalkylene carbonate. If the content of the polylactide is too small, blocking may seriously occur during processing of the resin composition, thus degrading workability and storage. And, if the content is too large, mechanical properties such as elongation, tensile property and the like may be degraded.

As a method for preparing polylactide, direct condensation polymerization of lactic acid, and ring opening polymerization of lactide monomers in the presence of an organic metal catalyst are known. Among them, in the case of direct condensation polymerization, viscosity rapidly increases as the condensation polymerization progresses, rendering it very difficult to effectively remove reaction by-products, moisture. Thus, since it is difficult to obtain high molecular weight polymer with weight average molecular weight of 100,000 or more, it is difficult to sufficiently, secure physical, mechanical properties of polylactide. Meanwhile, in the case of ring opening polymerization of lactide monomers, since lactide monomer should be first prepared from lactic acid, the preparation process is complicated compared to condensation polymerization and high unit cost is required, but relatively high molecular weight resin may be easily obtained through the lactide ring opening polymerization using an organic metal catalyst, and it is advantageous in terms of control of polymerization speed, and thus is being commercially applied.

According to one embodiment of the invention, the monomer of the poly(meth)acrylate may be ester of (meth)acrylic acid and a C1-20 alkyl group, wherein the alkyl group may be a C1-20 linear or branched aliphatic alkyl group, or a C3-20 cyclic alkyl group. The monomer of the polyalkyl (meth)acrylate may be, for example, methyl(meth)acrylate, ethyl(meth)acrylate, n-butyl(meth)acrylate, 2-ethylhexyl (meth)acrylate, cyclohexyl(meth)acrylate, n-octyl(meth) acrylate, n-decyl(meth)acrylate, n-dodecyl(meth)acrylate, tetradecyl(meth)acrylate, lauryl(meth)acrylate, oleyl(meth) acrylate, palmityl(meth)acrylate, and stearyl(meth)acrylate and the like, but is not limited thereto, and may be selected considering the mechanical properties of resin to be finally obtained.

The polyalkyl(meth)acrylate may be included in the content of about 0.1 to about 10 parts by weight, preferably about 0.1 to about 5 parts by weight, based on 100 parts by weight of the polyalkylene carbonate. If the content of the polyalkyl(meth)acrylate does not fall within the above range, for example, if it is excessively included, processability may be degraded due to resin hardness difference between polyalkyl(meth)acrylate and polyalkylene carbonate.

Cellulose is most abundant natural polymer material existing in the earth, and photosynthesized a few hundred million tons every year. It is hard due to very high crystallinity and molecular weight, and is widely used as wood, paper pulp, resin and the like due to low solubility.

Due to the excellent mechanical properties of the cellulose, the resin composition of the present invention may have excellent elongation, tensile strength and thermal stability compared to the existing 3-component resin composition.

According to one embodiment of the invention, the cellulose may be included in the content of about 0.5 to about 20 parts by weight, preferably about 0.5 to about 15 parts by weight, based on 100 parts by weight of the polyalkylene carbonate. When the cellulose is included in the above range, the resin composition may have excellent mechanical properties, biodegradability and processability, and particularly, have remarkable thermal stability. If the cellulose is excessively included, transparency of resin may be lowered.

Particularly, in case polyalkylene carbonate, polylactide, polyalkyl(meth)acrylate and cellulose are include at the above explained content ratio, the prepared resin composition may exhibit very excellent thermal stability, and for example, when weight loss according to temperature change is measured using a DSC/TGA analysis apparatus, weight loss by thermal decomposition at about 300° C. may be very low as about 40% or less, preferably about 1 to 35%, more preferably about 10 to about 30%.

To the resin composition of the present invention, various additives may be added according to the use. For example, the additives may include additives for modification, a coloring agent (pigment, dye, and the like), filler (carbon black, titanium dioxide, talc, calcium carbonate, clay, and the like), and the like, but are not limited thereto. The additives for modification may include a dispersant, a lubricant, a plasticizer, a flame retardant, an antioxidant, an antistatic agent, a light stabilizer, a UV absorber, a crystallization promoter, and the like. The various additives may be added when preparing a pellet from a polyalkylene carbonate resin composition or when preparing a molded product by molding a pellet.

As a method for preparing the resin composition of the present invention, various known methods may be used. In order to obtain a uniform mixture, for example, the above explained polyalkylene carbonate, polylactide, and cellulose may be added at a specific ratio, and mixed by a henschel mixer, a ribbon blender, a blender and the like.

For melt-mixing, a VAN Antonie Louis Barye mixer, uniaxial or biaxial compressor may be used. The shape of the resin composition of the present invention is not specifically limited, and for example, it may be processed into a strand, a sheet, a flat panel, a pellet and the like.

According to another aspect of the invention, provided is a molded product prepared from the resin composition. The molded product may include, for example, a film, a film laminate, a sheet, a filament, non-woven fabric, an injection molded product, and the like.

A method of molding the resin composition of the present invention to obtain a molded product may include, for example, injection molding, compression molding, injection compression molding, gas assisted injection molding, foaming injection molding, inflation, T die, Calendar, blow molding, vacuum molding, pressure molding, and the like, and besides, any processing methods generally used in the technical field to which the invention pertains may be used without specific limitations.

Hereinafter, the actions and the effects of the invention will be explained in detail with reference to the following examples. However, these examples are presented only to illustrate the invention, and the scope of the invention is not limited thereto.

EXAMPLE

Preparation Example

Preparation of Polyethylene Carbonate (PEC)

Ethylene oxide and carbon dioxide were copolymerized using diethyl-zinc catalyst to prepare polyethylene carbonate resin as follows (Journal of Polymer Science B 1969, 7, 287; Journal of Controlled release 1997, 49, 263).

Into an autoclave reactor equipped with a stirrer, dried diethyl-zinc catalyst (1 g) and 10 mL of a dioxane solvent were introduced, and 0.1 g of purified water diluted in 5 mL of a dioxane solvent was introduced under slow stirring. The autoclave was filled With carbon dioxide to about 10 atm, and then, the mixture was stirred at 120° C. for 1 hour. Thereafter, purified ethylene oxide (10 g) was introduced, the autoclave was filled with carbon dioxide again to about 50 atm, and then, temperature was controlled to 60° C., and the mixture was reacted for about 48 hours. After the reaction, non-reacted ethylene oxide was removed under reduced pressure and dissolved in a dichloromethane solvent. The mixture was washed with a hydrochloric acid aqueous solution (0.1 M) and precipitated in a methanol solvent to Obtain polyethylene carbonate resin. About 15 g of resin was recovered, the production was confirmed by nuclear magnetic resonance spectrum, and weight average molecular weight analyzed through GPC was confirmed as 230,000.

Polylactide (PLA)

Weight average molecular weight: 230,000, Manufacturing Company: NatureWorks

Polymethylmethacrylate (PMMA)

Weight average molecular weight: 86,000, Manufacturing Company: LG MMA

Cellulose

Microcrystalline, powder, 20 μm, Manufacturing Company: Aldrich

Example

Preparation of Resin Composition

Example 1

186.1 g of the above prepared polyethylene carbonate (PEC), 9.9 g of polylactide (PLA), 1.98 g of polymethylmethacrylate (PMMA), and 2 g of cellulose (Cel) were mixed to prepare a resin composition.

As the PEC, PLA. PMMA and Cellulose (Cel), those dried in a vacuum oven of 40° C. overnight were used.

The prepared resin composition was made into a pellet form using a twin screw extruder (BA-19, Manufacturing Company: BAUTECH), and the resin in the form of a pellet obtained by extrusion was dried in a vacuum oven of 40° C. overnight, and then, made into a dog bone specimen.

Example 2

178.6 g of the above prepared polyethylene carbonate (PEC), 9.5 g of polylactide (PLA), 1.9 g of polymethylmethacrylate (PMMA), and 10 g of cellulose (Cel) were mixed to prepare a resin composition.

Except this, a resin in the form of a pellet and a specimen were prepared by the same method as Example 1.

Example 3

169.2 g of the above prepared polyethylene carbonate (PEC), 9 g of polylactide (PLA), 1.8 g of polymethylmethacrylate (PMMA), and 20 g of cellulose (Cel) were mixed to prepare a resin composition.

Except this, a resin in the form of a pellet and a specimen were prepared by the same method as Example 1.

Example 4

165 g of the above prepared polyethylene carbonate (PEC), 9 g of polylactide (PLA), 1.8 g of polymethylmethacrylate (PMMA), and 24 g of cellulose (Cel) were mixed to prepare a resin composition.

Except this, a resin in the form of a pellet and a specimen were prepared by the same method as Example 1.

Example 5

159 g of the above prepared polyethylene carbonate (PEC), 9 g of polylactide (PLA), 1.8 g of polymethylmethacrylate (PMMA), and 30 g of cellulose (Cel) were mixed to prepare a resin composition.

Except this, a resin in the form of a pellet and a specimen were prepared by the same method as Example 1.

Comparative Example 1

188 g of the above prepared polyethylene carbonate (PEC), 10 g of polylactide (PLA), and 2 g of polymethylmethacrylate (PMMA) were mixed without adding cellulose (Cel), to prepare a resin composition.

Except this, a resin in the form of a pellet and a specimen were prepared by the same method as Example 1.

The compositions of the resin compositions prepared in Examples and Comparative Example are summarized in the following Table 1.

TABLE 1

| | PEC content (g) | PLA content (g) | PMMA content (g) | Cel content (g) |
|---|---|---|---|---|
| Example 1 | 186.1 | 9.9 | 1.98 | 2 |
| Example 2 | 178.6 | 9.5 | 1.9 | 10 |
| Example 3 | 169.2 | 9 | 1.8 | 20 |
| Example 4 | 165 | 9 | 1.8 | 24 |
| Example 5 | 159 | 9 | 1.8 | 30 |
| Comparative Example 1 | 188 | 10 | 2 | 0 |

Experimental Example 1

For the specimens prepared in Examples and Comparative Example, tensile strength, elongation and E-Modulus were measured with a Universal Testing Machine (UTM).

(Model name: Zwick/Z010, Manufacturing Company: Zwick/Roell, Speed: 50 mm/min)

The measurement results are summarized in the following Table 2.

TABLE 2

| | Tensile strength (kg/cm$^2$) | Elongation (%) | E-modulus (Gpa) |
|---|---|---|---|
| Example 1 | 91 | 234 | 0.03 |
| Example 2 | 104 | 251 | 0.03 |
| Example 3 | 128 | 223 | 0.05 |
| Example 4 | 135 | 219 | 0.05 |
| Example 5 | 146 | 210 | 0.06 |
| Comparative Example 1 | 92 | 236 | 0.03 |

As shown in the Table 2, the specimens made of the resin compositions according to the present invention generally have excellent mechanical properties, and particularly, Examples 3 to 5 exhibited excellent measurements results in terms of tensile strength and E-modulus, and Example 2 exhibited excellent measurement result in terms of elongation.

Experimental Example 2

For the resin in the form of a pellet prepared in Examples and Comparative Example and general PEC resin, weight loss according to temperature change, glass transition temperature (Tg, ° C.), and 50% decomposition temperature (50% Td, ° C.) were measured using a DSC/TGA analysis apparatus. For TGA analysis, measurement was conducted under nitrogen atmosphere while raising the temperature from room temperature to 400° C. at a rate of about 10° C./min.

The measured glass transition temperature (Tg, ° C.), and 50% decomposition temperature (50% Td, C) are summarized in the following Table 3, and weight losses according to temperature change of Examples 1 to 3 and Comparative Example 1 are shown as a graph in FIG. 1

TABLE 3

|  | Tg(° C.) | 50% Td(° C.) |
| --- | --- | --- |
| Example 1 | 21.4 | 299 |
| Example 2 | 22.0 | 323 |
| Example 3 | 22.4 | 340 |
| Example 4 | 22.5 | 348 |
| Example 5 | 22.6 | 352 |
| Comparative Example 1 | 20.5 | 286 |
| PEC resin | 20.5 | 225 |

As shown in the Table 3, the resin composition according to the present invention has high glass transition temperature, and also has high 50% decomposition temperature, compared to the existing polyethylene carbonate resin. Particularly, Examples 3 to 5 have very high glass transition temperature and 50% decomposition temperature compared to Comparative Example, thus confirming very excellent thermal stability.

FIG. 1 is a graph showing the result of measuring weight loss according to temperature change.

As shown in the graph of FIG. 1, the resin compositions of Examples 1 to 3 have smaller weight loss according to temperature, than that of Comparative Example 1. Specifically, weight loss at about 300° C. was less than about 20% in Example 1, less than about 7% in Example 2, and less than about 3% in Example 3, but in the case of Comparative Example 1, about 90% or more were lost, and thus, Comparative Example 1 has very low thermal stability compared to Examples.

Examples 4 and 5, although not shown in the graph, respectively exhibit weight loss of less than about 1% at about 300° C. thus confirming very excellent stability to high temperature environment.

Particularly, it was confirmed that in the case of Examples, weight loss according to increase in temperature decreases as the content of cellulose increases, and it was also confirmed that Example 5 wherein cellulose was added most in the content of about 19 wt % to PEC exhibit highest thermal stability.

Namely, it is judged that cellulose functions for a reinforcing agent in the resin composition, to influence on the properties of the resin composition, and thus, the resin composition did not cause evaporation, sublimation, thermal decomposition and the like despite increase in temperature. Thus, it is confirmed that thermal stability of the resin composition according to the present invention is very superior to the existing resin composition.

The invention claimed is:

1. A resin composition comprising:

100 parts by weight of polyalkylene carbonate comprising a repeat unit represented by the following Chemical Formula 1;

0.5 to 20 parts by weight of polylactide comprising a repeat unit represented by the following Chemical Formula 2;

0.1 to 10 parts by weight of polyalkyl(meth)acrylate; and 0.5 to 20 parts by weight of cellulose:

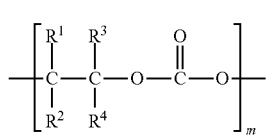

[Chemical Formula 1]

in Chemical Formula 1, $R^1$ to $R^4$ are independently hydrogen, a C1-20 linear or branched alkyl group, a C6-20 aryl group, a C2-20 alkenyl group or a C3-20 cycloalkyl group, and at least two of $R^1$ to $R^4$ may be connected with each other to form a C3-10 cycloalkyl group, and m is an integer of 10 to 1,000;

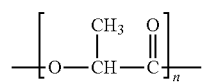

[Chemical Formula 2]

in Chemical Formula 2, n is an integer of 10 to 1000; and the alkyl group of the polyalkyl(meth)acrylate is a C1-20 linear or branched alkyl group, or a C3-10 cycloalkyl group.

2. The resin composition according to claim 1, wherein the polyalkylene carbonate has weight average molecular weight of 10,000 to 1,000,000.

3. The resin composition according to claim 1, wherein the polyalkylene carbonate is at least one selected from the group consisting of polyethylene carbonate, polypropylene carbonate, polypentene carbonate, polyhexene carbonate, polyoctene carbonate, polycyclohexene carbonate and copolymers thereof.

4. The resin composition according to claim 1, wherein the polylactide is polymerized from L-lactic acid, D-lactic acid or L,D-lactic acid.

5. The resin composition according to claim 1, wherein the polylactide has weight average molecular weight of 100,000 to 1,000,000.

6. The resin composition according to claim 1, wherein the monomer of the polyalkyl(meth)acrylate are methyl (meth)acrylate, ethyl(meth)acrylate, n-butyl(meth)acrylate, 2-ethylhexyl(meth)acrylate, cyclohexyl(meth)acrylate, n-octyl(meth)acrylate, n-decyl(meth)acrylate, n-dodecyl (meth)acrylate, tetradecyl(meth)acrylate, lauryl(meth)acrylate, oleyl(meth)acrylate, palmityl(meth)acrylate, or stearyl (meth)acrylate.

7. The resin composition according to claim 1, wherein the resin composition further comprises at least one additive selected from the group consisting of pigment, dye, carbon black, titanium dioxide, talc, calcium carbonate, clay, a dispersant, a lubricant, a plasticizer, a flame retardant, an antioxidant, an antistatic agent, a light stabilizer, a UV absorber, and a crystallization promoter.

8. A molded product prepared from the resin composition according to claim 1.

9. A film laminate comprising a film prepared from the resin composition according to claim 1.

* * * * *